United States Patent
Terada

[11] 3,891,096
[45] June 24, 1975

[54] TRANSFERRING DEVICE FOR OBJECTS IN WHICH A REDUCED PRESSURE IS APPLIED CONTINUOUSLY

[75] Inventor: Hideto Terada, Toyokawa, Japan

[73] Assignee: Sintokogio, Ltd., Aichi-ken, Japan

[22] Filed: Mar. 22, 1974

[21] Appl. No.: 453,925

[30] Foreign Application Priority Data
Mar. 29, 1973 Japan.............................. 48-35927
June 21, 1973 Japan.............................. 48-73865

[52] U.S. Cl. .......... 214/1 BB; 137/614.04; 198/221
[51] Int. Cl. ............................................ B65g 25/08
[58] Field of Search.................. 214/1 BB; 198/221; 137/614.04

[56] References Cited
UNITED STATES PATENTS
3,289,821  12/1966  Bosse ........................... 198/221
FOREIGN PATENTS OR APPLICATIONS
856,471  12/1960  United Kingdom............ 137/614.04

Primary Examiner—Robert J. Spar
Assistant Examiner—George F. Abraham
Attorney, Agent, or Firm—Armstrong, Nikaido & Wegner

[57] ABSTRACT

A transferring device for objects in which a reduced pressure must be applied continuously, which is adapted, when said objects in which a reduced pressure must be maintained continuously are transferred intermittently by means of a conveyor, to maintain the reduced pressure in said objects by opening the ones on one side of each said object of the normally closed valves provided on the both sides of each said object only when each said object stops moving so that the reduced pressure acts in each said object, and by closing said valves on said one side of each said object when each said object moves and at the same time opening the valves on the other side of each said object.

10 Claims, 8 Drawing Figures

TRANSFERRING DEVICE FOR OBJECTS IN WHICH A REDUCED PRESSURE IS APPLIED CONTINUOUSLY

BACKGROUND OF INVENTION

The present invention relates to a transferring device for objects in which a reduced pressure must be applied continuously, and it is applicable to a case where objects are transferred with a reduced pressure being applied to the interiors of the objects, as is done in the transferring devices for vacuum sealed molds.

When there is a necessity to apply a reduced pressure continuously to the interiors of objects being transferred from a given position in a circulating line to another given position in the circulating line as is the case with, for instance, a casting line using vacuum sealed molds, the prior arts commonly employ a method in which said circulating line is constructed in the shape of a circle in the central part of which is arranged a rotary coupling in communication with a vacuum source, and the rotary coupling and each object are connected together by means of a rubber hose. However, in such a construction, since the circulating line in the shape of a circle rotates with a multiplicity of rubber hoses extending radially from the central part of said circulating line, various structures necessary for operation cannot be provided inside said circular circulating line, where the operators cannot have access to, and devices for treating each object and operating spaces required by such devices must be arranged outside said circulating line, resulting in such disadvantages as an increased floor area needed, a lowering in productivity, and the like.

SUMMARY OF THE INVENTION

A principal object of the present invention is to provide an effective device for transferring objects in which a reduced pressure must be applied continuously.

Another object of the present invention is to provide a device for transferring objects, in which, when the application is in a circulating line such as a casting line using vacuum sealed molds and the like, objects such as vacuum sealed molds, in which a reduced pressure must be applied continuously, are adapted to pass on a straight portion in said circulating line as long as said objects need the reduced pressure, said objects passing on the straight portion are adapted to be capable of advancing pitch by pitch in the same manner as the objects being transferred in the other parts of the circulating line with the reduced pressure being applied at all times in said objects advancing in the straight portion so that the circulating line is adapted to be constructed in any shape desired.

A further object of the present invention is to provide a device for transferring objects, in which reduced pressure pipes such as rubber hoses and the like connected to objects in which a reduced pressure must be applied, are arranged such that they do not stand in the operators' way to improve the productivity of said device.

A further object of the present invention is to provide a transferring device for molds, which is adapted to form a mold with a high efficiency when used as a transferring device for vacuum sealed molds.

These objects and features of the present invention will become more clear by the following description taking reference with the attached drawings showing embodiments of the present invention, in which.

Figure 1:
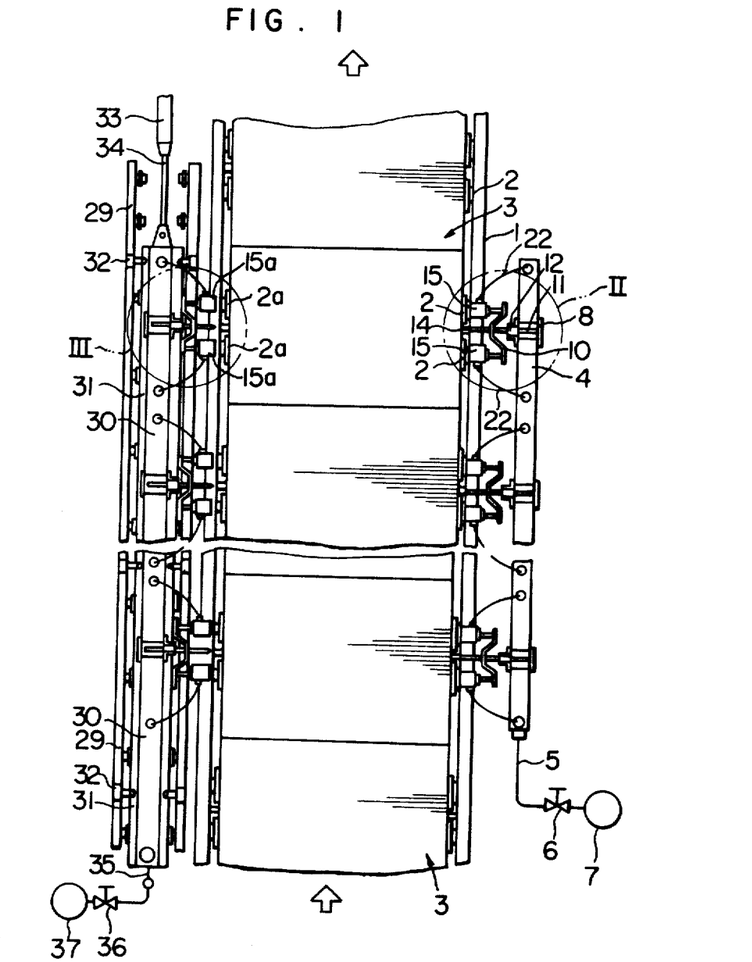
FIG. 1 is a partly broken away plan view showing a straight portion of a circulating line.
Figure 2:
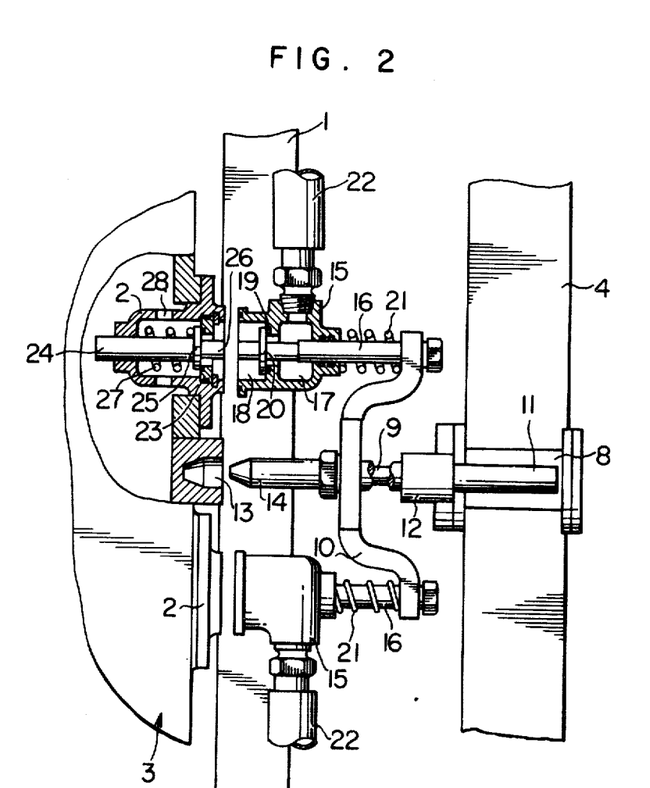
FIG. 2 is a partly broken away plan view illustrating the part II in FIG. 1.
Figure 3:
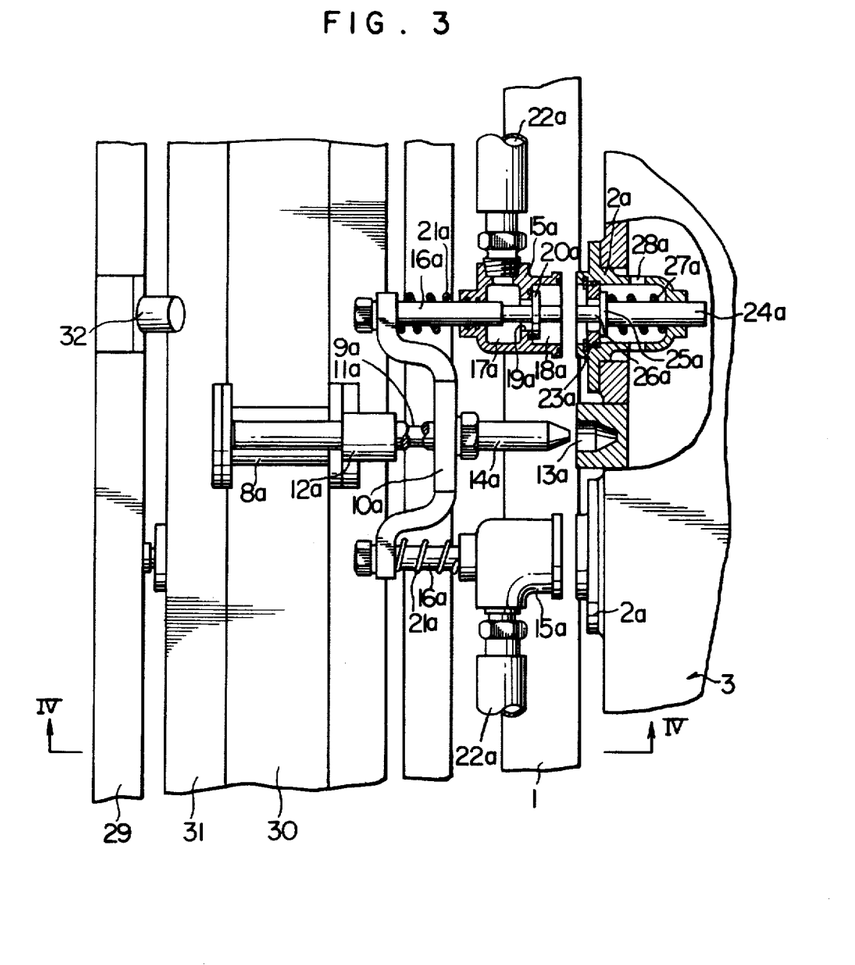
FIG. 3 is a partly broken away plan view showing the part III in FIG. 1.
Figure 4:
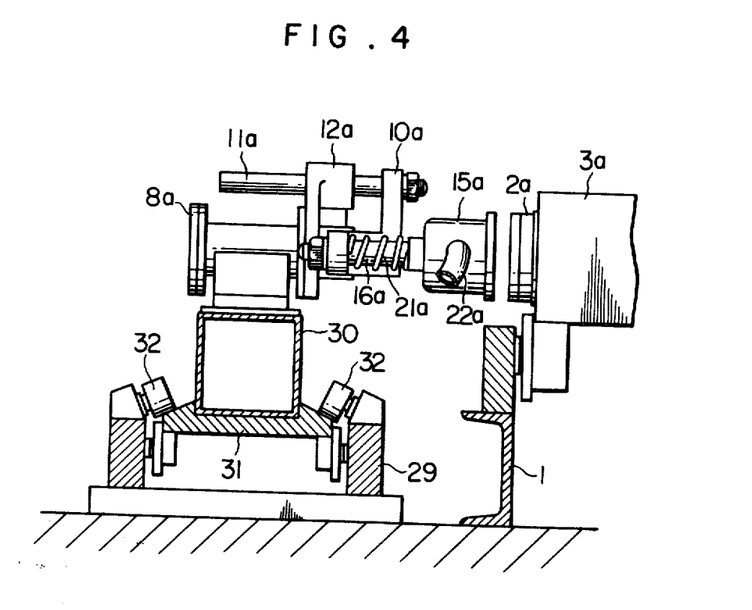
FIG. 4 is an elevational view seen in the direction of the arrows IV in FIG. 3.

DETAILED DESCRIPTION OF INVENTION:

The embodiments of the present invention will be explained hereunder with reference to the drawings. In the figures, on a roller-type conveyor 1 constructed in the shape of a circle are placed in single file a multiplicity of objects 3 such as vacuum sealed molds and the like, in which a reduced pressure must be applied, each of said objects 3 having on the both sides thereof normally closed valves 2 and 2a, and being advanced pitch by pitch intermittently by a pushing means and the like (not shown) in the direction of the arrow. A closed elongated box 4 is disposed outside and along one side of a straight portion of said conveyor 1, and said elongated box 4 communicates with a vacuum source 7 through a suction pipe 5 and a valve 6. On said elongated box 4 are arranged cylinders 8 directed inwardly, i.e., toward the conveyor 1. A fitting plate 10 is fixed securely to the end of a piston rod 9 of each cylinder 8. The fitting plate 10 has securely fixed thereto a guiding bar 11 in sliding engagement with a guiding cylinder 12 provided on the cylinder 8, so that the piston rod 9 moves in a straight line in the cylinder 8. A positioning bar 14 corresponding to a positioning hole 13 arranged in one side of said object 3, projects from the lower central part of the fitting plate 10. To the both ends of the fitting plate 10 are securely fixed the ends of valve rods 16 of normally closed push valves 15 corresponding to normally closed valves 2 of said object 3. The term "normally closed push valve" used in this specification means a valve which is normally closed and, when operated, opens to open the normally closed valve described previously. The construction of the normally closed push valve will be explained hereunder in detail. As shown in FIG. 2, the interior of the normally closed push valve 15 is divided by a partition wall into two parts, i.e., a closed chamber 17 in the rear and an open chamber 18 in the front. A communicating passage 19 establishes a communication between the closed chamber 17 and the open chamber 18. The valve rod 16 of the normally closed push valve 15 extends slidably through a rear wall of the closed chamber 17, and further extends through the communicating passage 19 to reach the interior of the open chamber 18. At the end of the valve rod 16 is provided a closing piece 20 for opening and closing the communicating passage 19 in the open chamber 18. Between the normally closed push valves 15 and the fitting plate 10 are arranged coiled springs 21, so that the normally closed push valves 15 are normally pressed forwardly. Thus, the communicating passage 19 is normally closed by the closing piece 20. The closed chamber 17 communicates with the elongated box 4 previously described through a coupling and a rubber hose 22. The interior of the normally closed valve 2 disposed on the one side of the object 3 at a position corresponding to the normally closed push valve 15, is partitioned from the outside by means of a washer 23 having a hole therein. The valve rod 24 slidably extends into the interior of the normally closed valve 2 from the rear of said normally closed valve 2. The valve rod 24 has to the end thereof fixed securely a closing piece 25 to which is fixed securely a projection 26 extending through the hole of the washer 23. Between the closing piece 25 and the rear inner wall of the normally closed valve 2 is provided a coiled spring 27, so that the closing piece 25 normally closes the hole of the washer 23. Further, in the rear part of the normally closed valve 2 are bored air vents 28 communicating with the interior of the object 3. On the other hand, a roller conveyor 29 is arranged in parallel to the conveyor 1 along the other side of the straight portion of the conveyor 1. On said roller conveyor 29 is placed a fitting base 31 having a closed box 30 thereon, the fitting base 31 being supported by auxiliary rollers 32 of the roller conveyor 29 such that the fitting base 31 cannot move upwardly. The fitting base 31 is connected to a piston rod 34 of a cylinder 33 for producing a reciprocating movement having a stroke that is the same in length as the feed pitch of the object 3. The closed box 30 communicates with a vacuum source 37 through a suction pipe 35 and a valve 36, in the same manner as the elongated box 4. On the other side opposite to the one side previously described, of the object 3 are provided normally closed valves 2a having the same construction as the normally closed valves 2 in a direction opposite to that of said normally closed valves 2 and in a corresponding relation to said normally closed valves 2. Normally closed push valves 15a with the same construction as the normally closed push valves 15 described previously, are arranged in a corresponding relation to said normally closed valves 2a to be operated through valve rods 16a and a fitting plate 10a by a cylinder 8 mounted on the closed box 30. Through the figures, the symbols a indicate the parts which have identical configurations and actions with the parts with the same numerals as the first-mentioned parts but lacking said symbols a.

Figure 5:
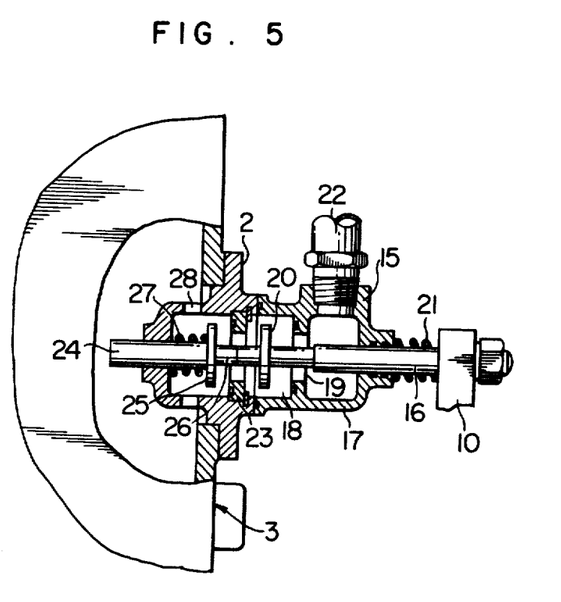
FIG. 5 is a partly broken away enlarged view of FIG. 1 illustrating the state of communication established between a normally closed push valve and a normally closed valve.

An explanation will be given hereunder on the operation of the transferring device in accordance with the present invention, which has the construction described above. When a multiplicity of the objects 3 such as vacuum sealed molds in which a reduced pressure must be applied and which are placed in single file on the conveyor 1 to be transferred moving intermittently, have stopped their movement, the normally closed valves 2 are forcedly engaged by the normally closed push valves 15 on one side of the conveyor 1, so that the interior of each object 3 is in communication with the vacuum source 7 through said normally closed valves 2, said normally closed push valves 15, the elongated box 4, the suction pipe 5, and the valve 6, as shown in FIGS. 1 and 5. In this state, if the piston rod 9a is pushed out by operating the cylinder 8a on the closed box 30 (refer to FIG. 3), the ends of the normally closed push valves 15a on the other side of the conveyor 1 forcedly are engaged with the ends of the normally closed valves 2a. As the piston rod 9a is pushed out, the valve rod 16a is pushed out forwardly against the effect of a coiled spring 21a. The valve rod 16a being pushed out pushes a valve rod 24a rearwardly through a projection 26a in the normally closed valve 2a, so that a communicating passage 19a and a hole of a washer 23a, which have been closed by closing pieces 20a and 25a, are opened. At the same time, a positioning bar 14a is fitted in a positioning hole 13a in the object 3, guiding the normally closed push valve 15a and the normally closed valve 2a so that they are correctly brought into forced engagement with each other while being placed in an opposing relation. Consequently, as shown in FIG. 5, a communication is established between the normally closed push valve 15a and the normally closed valve 2a, and the communicating passage 19a and the hole of the washer 23a, which have been closed, are opened, so that the interior of the object 3 communicates with the vacuum source 37. As soon as the normally closed valves 2a and the normally closed push valves 15a on the other side of the conveyor 1 have been brought into forced engagement with each other, the cylinder 8 on the elongated box 4 is operated in the opposite direction to release the normally closed valves 2 and the normally closed push valves 15 on said one side of the conveyor 1 from forced engagement. With this operation, the closing pieces 20 and 25 are, together with the valve rods 16 and 24, restored to the positions in which they close the communicating passage 19 and the hole of the washer 23 with the help of the coiled springs 21 and 27, as shown in FIG. 2. Thus, the closing pieces 20 and 25 prevent the introduction of air. Then, each object 3 on the conveyor 1 is moved one pitch in the direction shown by the arrow using the pushing means and the like (not shown). At this point, the cylinder 33 is in a disengaged state and the positioning bar 14a is fitted in the positioning hole 13a, so that the fitting base 31 moves on the roller conveyor 29 together with the object 3. Therefore, during the movement of the object 3, a communication is continuously maintained between the interior of the object 3 and the vacuum source 37. Upon the stopping of the object 3, the cylinder 8 on the elongated box 4 is operated to bring the normally closed push valves 15 on said one side of the conveyor 1 into forced engagement with the normally closed valves 2 in the same manner as described previously, with the result that the interior of the object 3 comes in communication with the vacuum source 7 and a reduced pressure is maintained in the object 3. Subsequently, the cylinder 8a on the closed box 30 is operated in the opposite direction for restoring the normally closed valves 2a, the normally closed push valves 15a on the other side of the conveyor 1, the positioning bar 14a, and the positioning hole 13a to the state shown in FIG. 3. Then, the cylinder 33 is operated so that the closed box 30 is returned together with the fitting base 31 to the original position shown in FIG. 1. By repeating this series of operations, each object 3 on the conveyor 1 is advanced pitch by pitch intermittently while being in communication with one of the two vacuum sources at all times and with the reduced pressure being continuously applied in said object 3.

Hereunder, an explanation will be made on a mode of embodiment of the present invention in which the present invention is applied to the transferring device for vacuum sealed molds, with reference to FIGS. 6 through 8.

Figure 6:
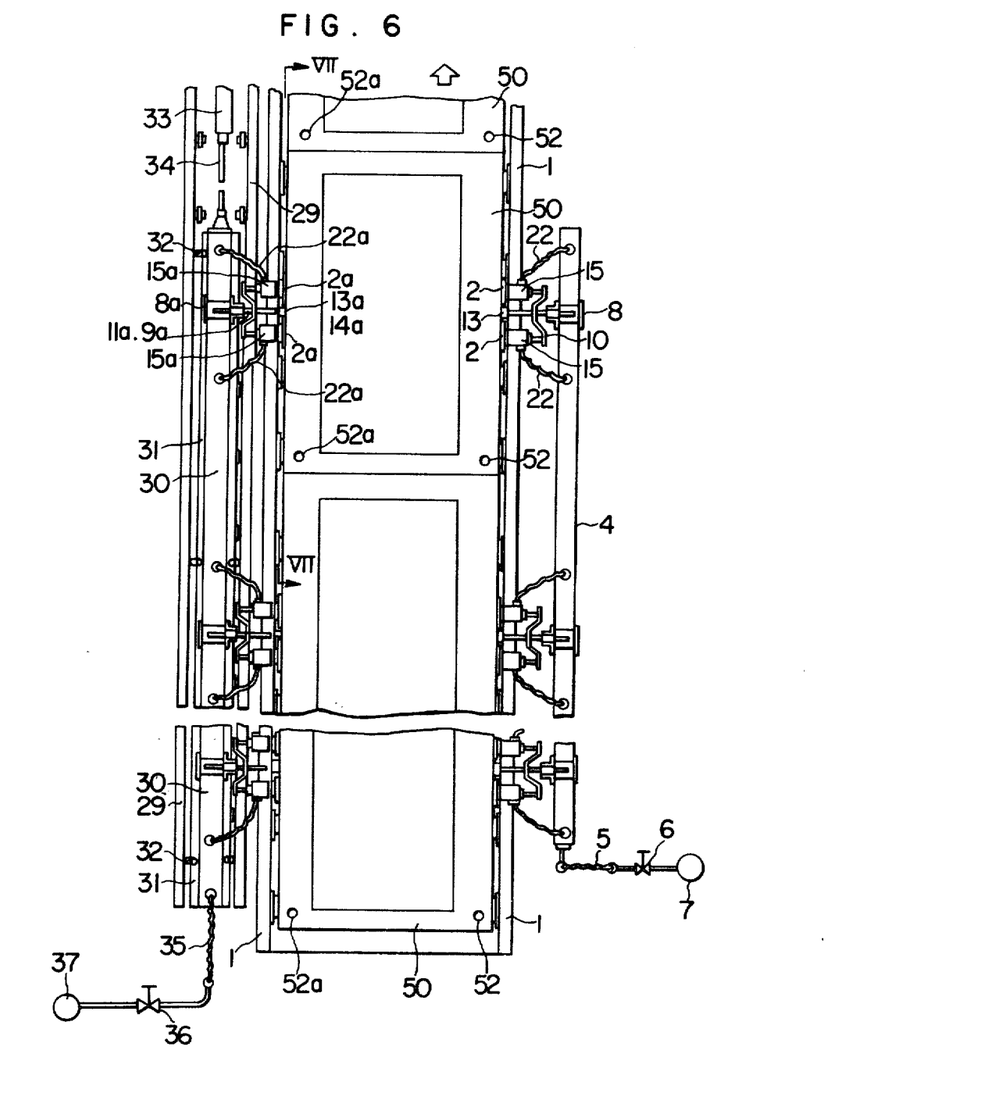
FIG. 6 is a partly broken away plan view showing an embodiment of the present invention used as a transferring device for vacuum sealed molds, which embodiment not including molding flasks.
Figure 7:
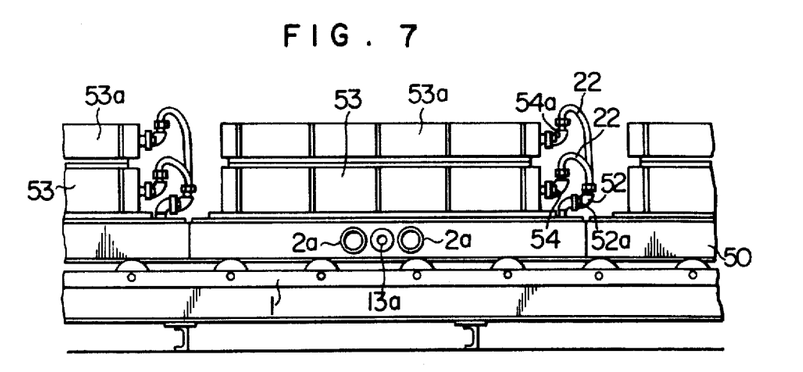
FIG. 7 is a side view seen in the direction of the arrows VII in FIG. 6.
Figure 8:
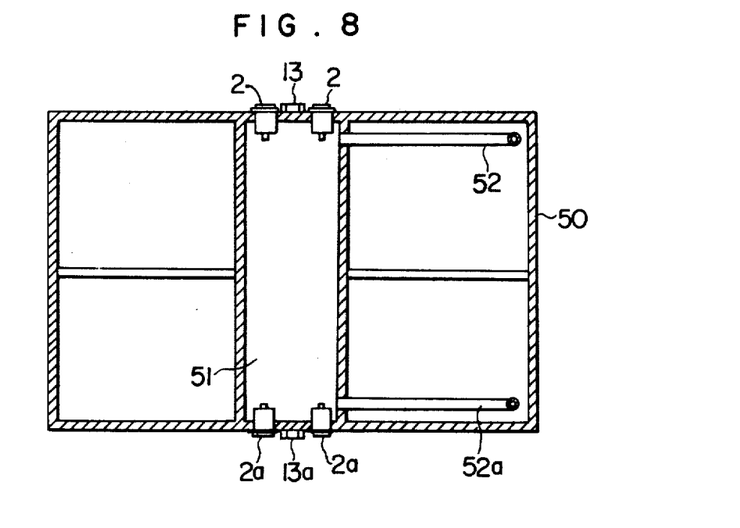
FIG. 8 is a cross-sectional view showing a board illustrated in FIGS. 6 and 7.

In FIGS. 6 through 8 showing a second embodiment of the present invention, the same numerals and symbols written at the same locations as those in FIGS. 1 through 5 illustrating the first embodiment, indicate the same parts and actions as those in the first embodiment. Referring to the figures, on a roller-type conveyor 1 constructed in the shape of a circle are placed in single file a multiplicity of boards 50, each of which boards 50 having on the both sides thereof normally closed valves 2 and 2a, and being advanced pitch by pitch intermittently by a pushing means and the like (not shown). In each board 50 there is provided a closed chamber 51 in communication with said normally closed valves 2 and 2a and having communicating pipes 52 and 52a which communicate with the interior of the closed chamber 51 and have their ends projected from the upper surface of the board 50. On the board 50 are placed in an assembled state molding flasks 53 and 53a for forming vacuum sealed molds, in which are provided reduced pressure structures (not shown). Suction ports 54 and 54a in communication with the reduced pressure structures in the molding flasks 53 and 53a, communicate with said communicating pipes 52 and 52a through suitable lengths of rubber hoses 22. Thus, the closed chamber 51 in the board 50 is placed in communication with the reduced pressure structures in the molding flasks 53 and 53a through the rubber hoses 22.

An explanation will be given hereunder on the operation of this embodiment of the present invention, which has the construction described above. When a multiplicity of assemblies each composed of the board 50 and the molding flasks 53 and 53a and which are placed in single file on the conveyor 1 to be transferred moving intermittently, have stopped their movement, normally closed valves 2 are forcedly engaged by normally closed push valves 15 on one side of the conveyor 1, so that the closed chamber 51 in the board 50 is in communication with a vacuum source 7 through the normally closed valves 2, the normally closed push valves 15, the rubber hoses 22, an elongated box 4, a suction pipe 5, and a valve 6, as shown in FIG. 6. In this state, if a piston rod 9a is pushed out by operating a cylinder 8a on a closed box 30, normally closed push valves 15a on the other side of the conveyor 1 are forcedly engaged with normally closed valves 2a, establishing a communication between closed box 30 and the closed chamber 51 in the board 50. Then, a cylinder 8 on the elongated box 4 is operated in the opposite direction to release the normally closed valves 2 and the normally closed push valves 15 on said one side of the conveyor 1 from forced engagement, with the result that the normally closed valves 2 are closed. Subsequently, the assembly composed of the board 50 and the molding flasks 53 and 53a and placed on the conveyor 1, is moved one pitch in the direction of the arrow by a pushing means and the like (not shown). At this point, a cylinder 33 is in a disengaged state and a positioning bar 14a is fitted in a positioning hole 13a, so that a fitting base 31 moves on a roller conveyor 29 together with the board 50. Therefore, during the movement of the board 50, a communication is continuously maintained between the closed chamber 51 in the board 50 and a vacuum source 37. Thus, a reduced pressure is continuously applied to the interiors of the molding flasks 53 and 53a. Upon the stopping of the board 50, the cylinder 8 on the elongated box 4 is operated to bring the normally closed push valves 15 into forced engagement with the normally closed valves 2 in the same manner as described previously, so that the closed chamber 51 in the board 50 comes in communication with the vacuum source 7 and the reduced pressure is maintained in the closed chamber 51 in the board 50. Then, the cylinder 8a on the closed box 30 is operated in the opposite direction for restoring the normally closed valves 2a, the normally closed push valves 15a on the other side of the conveyor 1, the positioning bar 14a, and the positioning hole 13a to their original positions. Immediately after, the cylinder 33 for producing reciprocating movement is operated so that the closed box 30 is returned together with the fitting base 31 to the original position. If this series of operations is repeated, the board 50 on the conveyor 1 is advanced pitch by pitch intermittently while being in communication with one of the two vacuum sources at all times and with the reduced pressure being continuously applied in the molding flasks 53 and 53a. In some instances, when the assembly composed of the board 50 and the molding flasks 53 and 53a has come to a stop, the molding flasks 53 and 53a placed on the board 50 are separated from the board 50 and are carried to a location within the lengths of the rubber hoses 22 and 22 a for undergoing the molding operation. In other instances, the molding flasks 53 and 53a are transferred to another conveyor provided in parallel to the conveyor 1 so that they are moved in parallel to the moving path of the conveyor 1. Thus, various required operations are performed on the molding flasks 53 and 53a whether they are moving or stopped, within a range the rubber hoses 22 and 22a can cover.

In the embodiments of the present invention described in the foregoing, each of the object 3 and the board 50 has on one side thereof and in the vicinity of said one side two normally closed valves 2 and two normally closed push valves 15, and on the other side thereof opposite to said one side and in the vicinity of said other side two normally closed valves 2a and two normally closed push valves 15a. However, depending upon the dimensions of the object in which a reduced pressure must be applied, the object may have on one side thereof and in the vicinity of said one side one normally closed valve 2 and one normally closed push valve 15, and on the other side thereof opposite to said one side and in the vicinity of said other side one normally closed valve 2a and one normally closed push valve 15a.

I claim:

1. A transferring device for objects in which a reduced pressure is applied continuously comprising a transporting means for advancing intermittently a plurality of said objects connected to one another in single file in the direction of said file; a first normally closed valve means provided on one side of each said object and adapted to apply the reduced pressure in each said object; a second normally closed valve means provided on the other side opposite to said one side of each said object and adapted to apply the reduced pressure in each said object; a first normally closed push valve means provided substantially in parallel relation to said file and along said one side of each said object and adapted to connect to and communicate with said first normally closed valve means of the predetermined numbers of said objects in which the reduced pressure is to be applied thereby connecting said predetermined numbers of them to a vacuum source; a second normally closed push valve means provided substantially in parallel relation to said file and along said other side of each said object and adapted to move along and in parallel to said file when said objects advance for connecting to and communicating with said second normally closed valve means of the predetermined numbers of said objects thereby connecting them to a vacuum source; a first operating means which operates only when said objects are stopped to connect said first normally closed push valve means to said first normally closed valve means; a second operating means adapted to connect said second normally closed push valve means to said second normally closed valve means and to release this connection only when said first operating means is operating; and a restoring means for restoring said second normally closed push valve means which have moved with the advance of said objects to the original position from which said second normally closed push valve means started to move.

2. A transferring device in accordance with claim 1 in which said object is provided on said one side thereof with a first recess and on said other side thereof with a second recess; said first operating means has a first positioning means for correctly connecting said first normally closed push valve means to said first normally closed valve means by engaging with said first recess; and said second operating means has a second positioning means for correctly connecting said second normally closed push valve means to said second normally closed valve means by engaging with said second recess and for moving said second normally closed push valve means together with said objects when said objects advance.

3. A transferring device in accordance with claim 1 in which said first normally closed push valve means are provided on a closed elongated box connected to the vacuum source and arranged substantially in parallel relation to said file.

4. A transferring device in accordance with claim 1 in which said second normally closed push valve means are provided on a closed elongated box connected to the vacuum source and are movable substantially in parallel to said file; and said restoring means is adapted to restore said box to the original position.

5. A transferring device in accordance with claim 1 in which said first operating means includes a piston and a cylinder, and is adapted to forcedly connect said first normally closed push valve means to said first normally closed valve means when said objects are stopped.

6. A transferring device in accordance with claim 1 in which said second operating means includes a piston and a cylinder, and is adapted to forcedly connect said second normally closed push valve means to said second normally closed valve means.

7. A transferring device in accordance with claim 4 wherein said device further including a fitting plate for supporting said elongated box, and a roller conveyor means which engagingly supports said fitting plate to make said closed box movable with said file.

8. A transferring device in accordance with claim 1 in which said object includes a board having therein a closed chamber communicating with said first and second normally closed valve means and molding flasks supported on said board and each having a suction port, and flexible hose means for communicating each said port with said chamber whereby said molding flasks are adapted to be removed from said board while being under application of the reduced pressure.

9. A transferring device in accordance with claim 8 in which said transporting means has a roller conveyor for movably supporting said board.

10. A transferring device in accordance with claim 4 in which said restoring means includes a piston and a cylinder, and said piston is connected to the end in the longitudinal direction of said elongated box and is adapted to restore said elongated box to the original position in said longitudinal direction.

* * * * *